US009151592B2

(12) United States Patent
Mizrahi

(10) Patent No.: US 9,151,592 B2
(45) Date of Patent: Oct. 6, 2015

(54) METHOD AND SYSTEM FOR MULTIPLE RESONANCE INTERFEROMETER

(71) Applicant: Skorpios Technologies, Inc., Albuquerque, NM (US)

(72) Inventor: Amit Mizrahi, Albuquerque, NM (US)

(73) Assignee: Skorpios Technologies, Inc., Albuquerque, NM (US)

( * ) Notice: Subject to any disclaimer, the term of this patent is extended or adjusted under 35 U.S.C. 154(b) by 150 days.

(21) Appl. No.: 13/733,331

(22) Filed: Jan. 3, 2013

(65) Prior Publication Data
US 2013/0188969 A1 Jul. 25, 2013

Related U.S. Application Data

(60) Provisional application No. 61/582,766, filed on Jan. 3, 2012.

(51) Int. Cl.
*G02F 1/225* (2006.01)
*G01B 9/02* (2006.01)
*G02F 1/21* (2006.01)
*G02B 6/293* (2006.01)
*G02B 6/12* (2006.01)
*G02F 1/015* (2006.01)

(52) U.S. Cl.
CPC .............. *G01B 9/02049* (2013.01); *G02F 1/21* (2013.01); *G02B 6/29335* (2013.01); *G02B 6/29338* (2013.01); *G02B 2006/12142* (2013.01); *G02F 1/225* (2013.01); *G02F 2001/0151* (2013.01); *G02F 2001/212* (2013.01); *G02F 2203/15* (2013.01)

(58) Field of Classification Search
CPC .................................................. G01B 9/02049
USPC ........................... 398/188, 201, 152; 356/450
See application file for complete search history.

(56) References Cited

U.S. PATENT DOCUMENTS

| 5,757,986 A | 5/1998 | Crampton et al. |
| 7,068,948 B2 * | 6/2006 | Wei et al. ...................... 398/184 |
| 2002/0071621 A1 | 6/2002 | Yamada |
| 2006/0002443 A1 | 1/2006 | Farber et al. |
| 2006/0008223 A1 | 1/2006 | Gunn, III et al. |
| 2006/0105508 A1 | 5/2006 | Zia et al. |
| 2007/0280577 A1 * | 12/2007 | Lu ..................................... 385/1 |
| 2008/0095486 A1 * | 4/2008 | Shastri et al. ..................... 385/3 |
| 2009/0016399 A1 | 1/2009 | Bowers |
| 2010/0039650 A1 | 2/2010 | Molin et al. |

(Continued)

FOREIGN PATENT DOCUMENTS

WO 2013/155378 A1 10/2013

OTHER PUBLICATIONS 7,742,122, 06/2010, Shetrit et al. (withdrawn).

(Continued)

*Primary Examiner* — David Payne
*Assistant Examiner* — Omar S Ismail
(74) *Attorney, Agent, or Firm* — Kilpatrick Townsend & Stockton LLP

(57) ABSTRACT

A multiple resonance interferometer structure includes an input port and a first arm coupled to the input port and including a first resonant structure. The multiple resonance interferometer also includes a second arm coupled to the input port and including a second resonant structure and an output port coupled to the first arm and the second arm.

20 Claims, 5 Drawing Sheets

(56) References Cited

U.S. PATENT DOCUMENTS

| | | |
|---|---|---|
| 2010/0060970 A1* | 3/2010 | Chen .......................... 359/245 |
| 2010/0142567 A1 | 6/2010 | Ward et al. |
| 2010/0231817 A1 | 9/2010 | Ide et al. |
| 2010/0266232 A1 | 10/2010 | Lipson et al. |
| 2010/0290732 A1 | 11/2010 | Gill |
| 2010/0296766 A1 | 11/2010 | Ishibashi et al. |
| 2010/0303476 A1 | 12/2010 | Barton et al. |
| 2011/0073989 A1 | 3/2011 | Rong et al. |
| 2011/0080580 A1* | 4/2011 | Fermann et al. ............. 356/301 |
| 2011/0085572 A1 | 4/2011 | Dallesasse et al. |
| 2011/0091148 A1 | 4/2011 | Li |
| 2011/0091221 A1* | 4/2011 | De Gabory et al. ........... 398/188 |
| 2011/0267676 A1 | 11/2011 | Dallesasse et al. |
| 2011/0317238 A1* | 12/2011 | Boffi et al. ................... 359/238 |
| 2012/0033910 A1 | 2/2012 | Morini et al. |

OTHER PUBLICATIONS

Notification of Transmittal of The International Search Report and The Written Opinion of The International Searching Authority, or The Declaration and International Search Report and Written Opinion of The International Searching Authority for International Application No. PCT/US2013/036313 mailed on Jul. 26, 2013, all pages.

* cited by examiner

METHOD AND SYSTEM FOR MULTIPLE RESONANCE INTERFEROMETER

CROSS-REFERENCES TO RELATED APPLICATIONS

This application claims priority to U.S. Provisional Patent Application No. 61/582,766, filed on Jan. 3, 2012, entitled "Method and System for Multiple Resonance Interferometer," the disclosure of which is hereby incorporated by reference in its entirety for all purposes.

BACKGROUND OF THE INVENTION

High speed modulators are utilized in communications systems to modulate signals, for example, digital signals. High speed modulators using, for example, Mach Zehnder interferometer designs, have been implemented in lithium niobate and InP as discrete components that are utilized in conjunction with discrete optical elements.

Current high speed modulators suffer from a variety of performance limitations. These include the need for a high drive voltage, which, in turn, results in high power consumption. Additionally, conventional high speed modulators occupy a large footprint, reducing device yield and increasing device cost. Moreover, integration with other optical systems can result in high insertion loss, which adversely impacts system performance.

Thus, there is a need in the art for improved methods and systems related to high speed modulators.

SUMMARY OF THE INVENTION

Embodiments of the present invention relate to optical systems and specifically to integrated photonics (e.g., Silicon Photonics). In a particular embodiment, a multiple resonant Mach Zehnder interferometer is provided. In the interferometer, a high sensitivity is provided by the resonant structure since a large change in the phase shift can be introduced by a small input signal (e.g., a small refractive index change). Because of the integration of the coupled resonant structures, the index variation that is introduced is enhanced by the resonant nature of the structure.

According to an embodiment of the present invention, a multiple resonance interferometer structure includes an input port, a first arm including a first resonant structure, a second arm including a second resonant structure, and an output port coupled to the first arm and the second arm.

According to another embodiment of the present invention, a multiple resonance interferometer structure is provided. The multiple resonance interferometer structure includes an input port, a first arm coupled to the input port and including a first resonant structure, a second arm coupled to the input port and including a second resonant structure, and an output port coupled to the first arm and the second arm.

According to a particular embodiment of the present invention, a method of modulating a signal is provided. The method includes receiving an optical signal at an input port and splitting the optical signal into a first arm signal and a second arm signal. The method also includes introducing a first predetermined phase delay in the first arm signal using a first resonance structure and introducing a second predetermined phase delay in the second arm signal using a second resonance structure. The method further includes combining the phase delayed first arm signal and the phase delayed second arm signal to provide a modulated signal and transmitting the modulated signal at an output port.

Numerous benefits are achieved by way of the present invention over conventional techniques. For example, embodiments of the present invention provide full phase modulation at the output, i.e., a $\pi$ phase difference between the two output states. Modulation, including full phase modulation, can be achieved using a low drive voltage according to embodiments of the present invention. Additionally, the methods and systems described herein provide small footprint systems that are characterized by low insertion loss as a result of the compact nature of the devices and their increased efficiency. Some embodiments utilize symmetric designs in which stable operation (e.g., a desired $\pi$ phase shift at the output) is achieved in phase shift keying implementations. These and other embodiments of the invention along with many of its advantages and features are described in more detail in conjunction with the text below and attached figures.

DETAILED DESCRIPTION OF SPECIFIC EMBODIMENTS

Embodiments of the present invention relate to optical systems. In a particular embodiment, a multiple resonant Mach Zehnder interferometer is provided. In the interferometer, a high sensitivity is provided by the resonant structure since a large change in the phase shift can be introduced by a small input signal (e.g., a small refractive index change). Because of the integration of the coupled resonant structures, the index variation that is introduced is enhanced by the resonant nature of the structure.

As described herein, resonant structures provide benefits in comparison with conventional techniques since resonant structures provide a large phase shift for a small change in refractive index. As an example, a diode can be used to introduce a change in refractive index. Some embodiments of the present invention utilize resonant structures in a Mach Zehnder Interferometer (MZI) configuration to implement, for example, phase shift keying (PSK).

Figure 1:
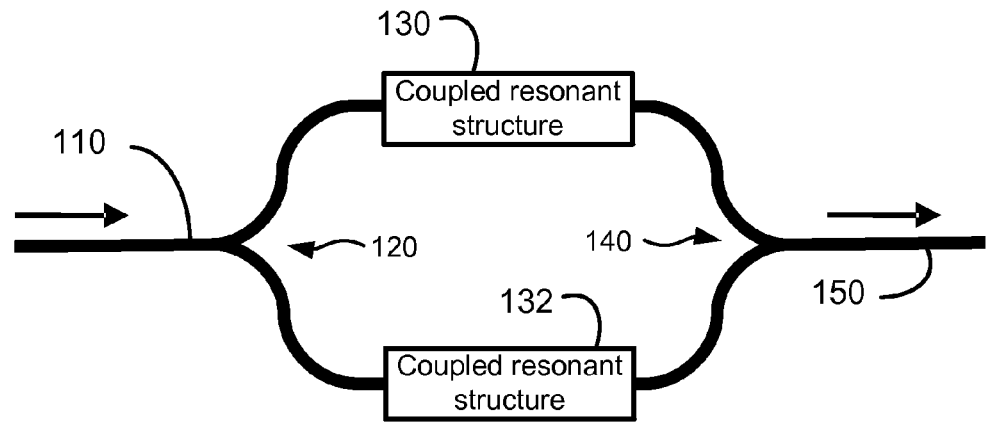
FIG. 1 is a simplified schematic diagram illustrating a double resonance assisted Mach Zehnder interferometer according to an embodiment of the present invention.

FIG. 1 is a simplified schematic diagram illustrating a double resonance assisted Mach Zehnder interferometer according to an embodiment of the present invention. As illustrated in FIG. 1, a Mach-Zehnder interferometer structure is utilized in combination with a set of resonant structures that can provide a predictable π phase shift between two output states. The interferometer includes an input port 110 coupled to a branching structure 120 (e.g., a Y-branch structure). Each branch or arm of the interferometer includes a coupled resonant structure 130 and 132. A coupling structure 140 combines the optical signal in each branch to provide an output signal at output port 150.

Embodiments of the present invention are characterized by a low drive voltage because the resonance structure enhances the input provided to the resonance structure. Additionally, the interferometer has a small footprint because the resonance structure is operable to introduce a large phase shift in a small device.

In a first embodiment described below, a ring or disk resonator is coupled to the waveguide in each arm such that the light in the arm of the interferometer passes through the resonator when on resonance. Application of a bias to the phase accrual structure (e.g., a diode), will change the refractive index in the resonator, which shifts the resonance curve for the resonator. As described below, the phase shift curve is illustrated for a center frequency ($\omega_0$). As the index of refraction of the resonator is modified, the transmission and phase curves shift accordingly, resulting in the desired phase shift for the arms of the interferometer. Embodiments of the present invention are not limited to the use of a diode for generating index differentials, but can include other phase shifting elements and index of refraction shifting elements such as, field effect transistors, or the like.

Figure 2:
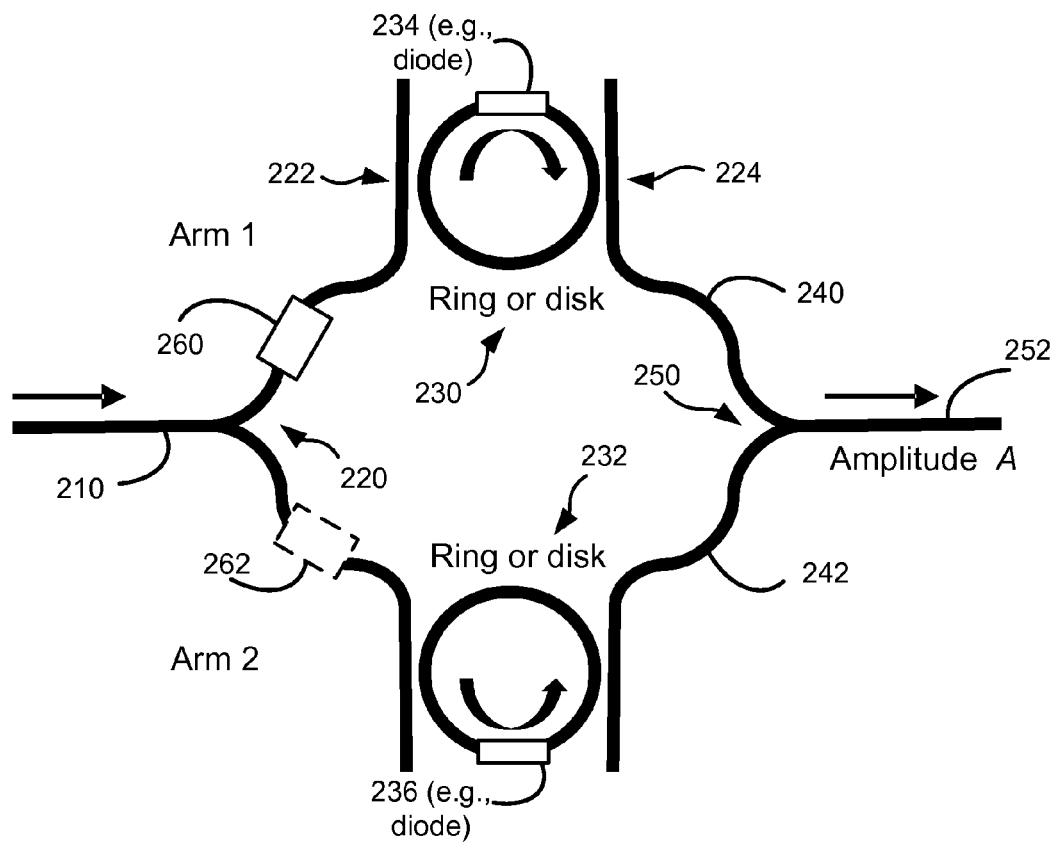
FIG. 2 is a simplified schematic diagram illustrating a diode-based double resonance assisted Mach Zehnder interferometer according to an embodiment of the present invention.

FIG. 2 is a simplified schematic diagram illustrating a diode-based double resonance assisted Mach Zehnder interferometer according to an embodiment of the present invention. Referring to FIG. 2, input port 210 receives an input optical signal and splits the input optical signal using Y junction 220 or other suitable form of a waveguide splitter into two arms, Arm 1 and Arm 2. Each arm of the structure terminates in a resonant structure 230 and 232, which in this embodiment, are matched ring structures including a resonant waveguide structure and a phase control element 234 and 236. In the illustrated embodiment, the phase control element is a diode but other phase control elements are included within the scope of the present invention. As an example, the phase control element could include other elements operable to introduce phase accrual in the rings, including thermal devices. Although the diode is illustrated as positioned between evanescent coupling regions (e.g., evanescent coupling regions 222 and 224 of resonant structure 230), phase adjustment at various sections of the resonant structure can be implemented. Output is provided at output port 252 after coupling of light from the two arms using optical coupler 250. As described below, additional phase control elements (e.g., heating elements) could be utilized in place of or to supplement the phase control elements illustrated in FIG. 2.

In operation, the resonant ring will have a set of resonances associated with it, for example, a set of resonances defined by the circumference of the ring supporting an integer number of effective wavelengths, an integer number of effective half-wavelengths, and the like.

Each resonant waveguide structure is optically coupled to another arm of the Mach Zehnder structure, illustrated by arms 240 and 242. These arms, serving as the output arms of the resonant structures, are optically coupled by waveguide combiner 250, providing an output signal to output port 252.

Referring to FIG. 2, a DC "bias" is provided through the use of phase control element 260 and optional phase control element 262. These phase control elements, which can be referred to as DC phase shift elements, are located outside the resonant structures, provide a DC bias function and can be implemented in one of several manners, including diodes for phase control, thermal elements, or the like.

Figure 3:
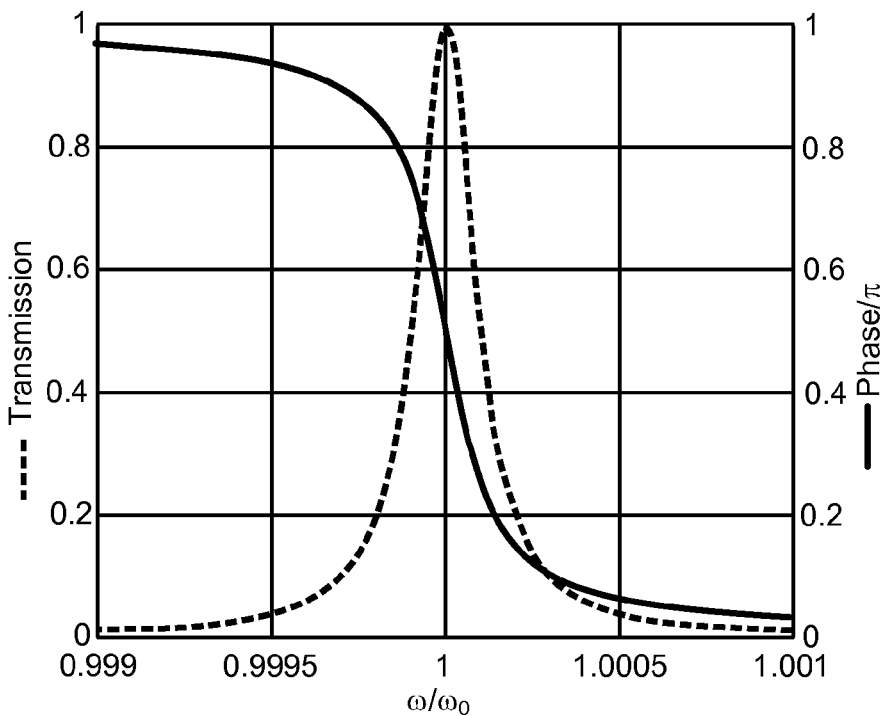
FIG. 3 is a plot illustrating transmission and phase shift of a single resonant structure on one of the Mach Zehnder arms as a function of normalized frequency according to an embodiment of the present invention.

FIG. 3 is a plot illustrating transmission and phase shift of a single resonant structure on one of the Mach Zehnder arms as a function of normalized frequency according to an embodiment of the present invention. Each arm of the resonant Mach Zehnder structure is characterized by such a transfer function associated with the individual ring. As illustrated in FIG. 3 the transmission profile peaks at a resonant frequency ($\omega/\omega_0$), thereby transmitting light at resonant frequencies or wavelengths.

Each ring is also characterized by a phase profile as a function of frequency, transitioning in this example, from a phase of about π on the low side of the resonance to a phase of zero on the high side of the resonance. It should be noted that the transmission profile is illustrated as peaking at unity in this example, but it will be appreciated that losses resulting from evanescent coupling between the waveguides in the arms and the waveguides in the rings, losses propagating through the phase control element and the like, may result in some optical losses producing a transfer function with a peak at a value less than unity. One of ordinary skill in the art would recognize many variations, modifications, and alternatives.

As described herein, the phase control elements illustrated in FIG. 2 are utilized to shift the position of the resonance during operation. As an example, the wavelength of operation of the optical signal passing through the system is fixed at a given wavelength (i.e., a given frequency). During operation according to one embodiment, the phase accrual in the resonant structures is adjusted to position the resonance frequency (i.e., $\omega/\omega_0$) such that the 3 dB points of the transmission profile are alternatively aligned with the given frequency propagating through the system.

Figure 4:
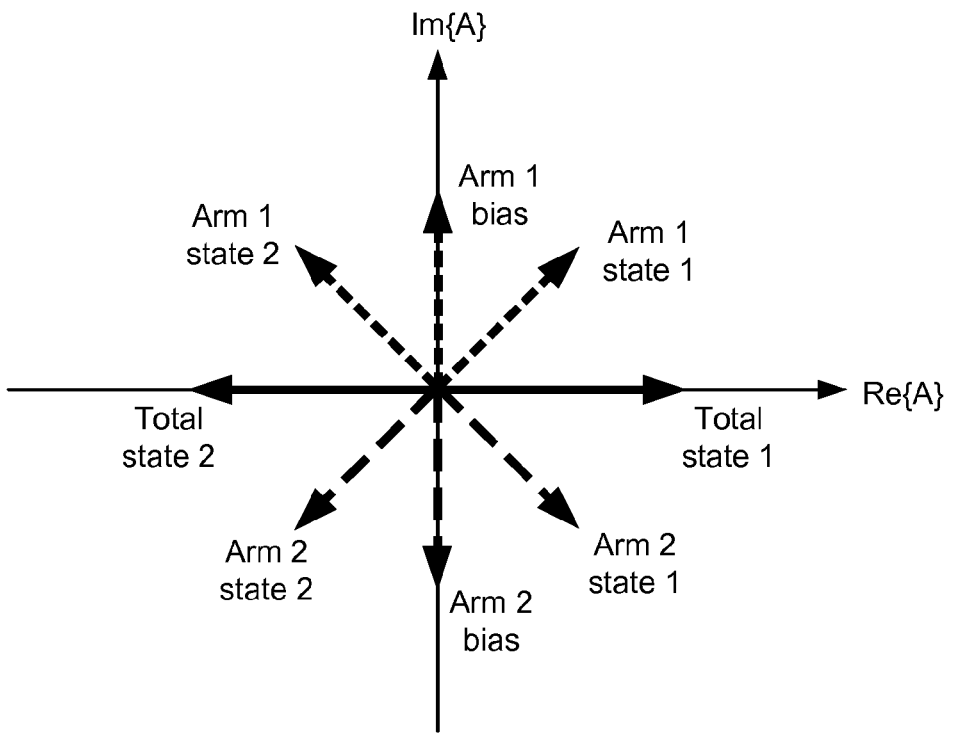
FIG. 4 is a plot illustrating the complex plane of the optical field amplitude according to an embodiment of the present invention.

Referring to FIGS. 3 and 4, the phase of the diode or other phase accrual element associated with the resonance structure in the first arm is initially adjusted to slide the transfer function to the right to align the 3 dB point of the transmission profile with the light in the system, producing a transmission of about 0.5 and a phase of about 0.75π. The phase of the diode or other phase accrual element associated with the resonance structure in the second arm is initially adjusted to slide the transfer function to the left to align the matching 3 dB point of the transmission profile with the light in the system, producing a transmission of about 0.5 and a phase of about 0.25π. In this embodiment, alternately changing the refractive index to shift between the two 3 dB points (as a specific example) results in a phase shift of about π/2. Accordingly, in this example, the two arms are biased at the null and driven differentially with ±π/4 on each arm. The insertion loss in this example is a total of about 6 dB (~3 dB due to each arm, and ~3 dB due to the interference), which is acceptable in many applications.

FIG. 4 is a plot illustrating the complex plane of the optical field amplitude according to an embodiment of the present invention. As illustrated in FIG. 4, the real and imaginary optical field amplitudes are shown for each arm during differential operation as described above. Arm 1 utilizes a bias aligned with the positive imaginary axis and alternates between positive and negative real values with a positive imaginary component. Arm 2 utilizes a bias aligned with the negative imaginary axis and alternates between positive and negative real values with a negative imaginary component.

Accordingly, the total amplitude for State 1 is a positive value (zero phase) and the total amplitude for State 2 is a negative value (π phase), producing the desired π phase shift between states.

Although a particular transfer function is illustrated in FIG. 3, this particular profile is not required by the present invention. In other embodiments, multiple resonant structures are utilized in combination to provide a transmission profile including one or more flat-top profiles as can be obtained using a multiple-resonant structure as well as a phase profile with a it phase shift across the flat-top portion of the transmission profile. In this case there is no inherent insertion loss. One of ordinary skill in the art would recognize many variations, modifications, and alternatives.

Figure 5:
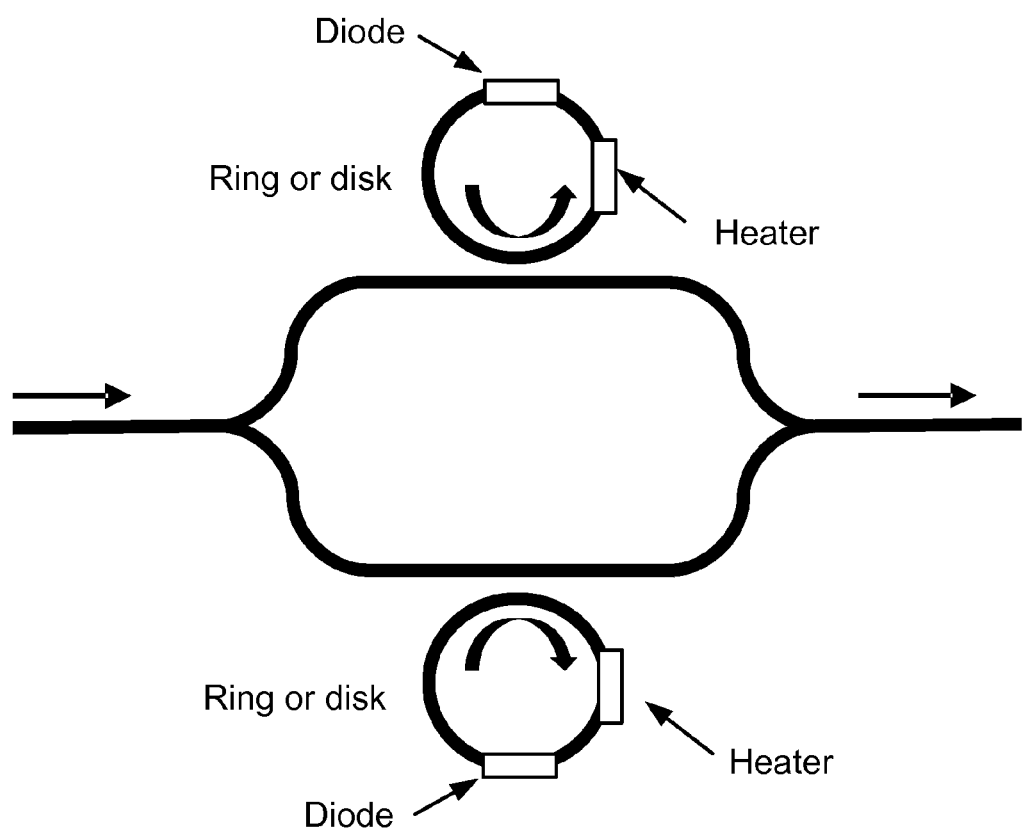
FIG. 5 is a simplified schematic diagram illustrating a diode-based double resonance assisted Mach Zehnder interferometer according to another embodiment of the present invention.

FIG. 5 is a simplified schematic diagram illustrating a diode-based double resonance assisted Mach Zehnder interferometer according to another embodiment of the present invention. In this embodiment, resonant phase shifting elements that introduce a transmission dip at a resonance frequency can be utilized to introduce the resonant phase shift. Thus, referring to FIG. 3, the transfer function illustrated in FIG. 3 would be inverted, decreasing from unity (ideally) to zero at the resonance. It should be noted that the embodiment illustrated in FIG. 5 shares some common elements with the embodiment illustrated in FIG. 2. Accordingly, description related to the elements discussed in relation to FIG. 2 are applicable, as appropriate, to the elements illustrated in relation to FIG. 5.

As illustrated in FIG. 5, phase accrual has been implemented by a combination of heaters for long-term control and diodes for high speed control. The thermal control can be used to tune the device to specific wavelengths of operation and the fast response is achieved using the diodes. Heaters or other index control elements can be added to the resonance structures illustrated in FIG. 2 to enhance control over the index of refraction effects. One of ordinary skill in the art would recognize many variations, modifications, and alternatives. Thus, it should be noted that the use of index control elements (e.g., heating elements for thermal tuning) can be applied in the context of the devices illustrated in FIG. 2.

Although ring or disk resonators are illustrated in FIGS. 2 and 5 as the coupled resonant structures that are provided in one or more legs of the Mach Zehnder interferometer, embodiments of the present invention are not limited to these implementations and other resonant structures can be utilized, including Fabry-Perot resonant structures, grating-based structures, and the like. Additionally, combinations of resonant structures can be utilized to provide variations in the transmission and phase profiles of the resonant structures.

Additionally, although a single phase control element is illustrated in each resonant structure (i.e., a single diode is illustrated in each resonance structure in FIG. 2), embodiments of the present invention are not limited to this example, and other phase control elements can be utilized. As an example and as illustrated in FIG. 5, a thermal phase control element (e.g., a heater) could be added to the ring to provide control over long-term variations in index of refraction and therefore be utilized in conjunction with high speed control achieved using, for example diodes. Depending on the speed of operation, thermal phase control elements can be utilized in place of or in combination with carrier control elements such as diodes, which can operate in depletion mode, injection mode, or the like. In some embodiments, a symmetric configuration in which both arms include a resonance structure it utilized although this is not required by the present invention. As an example, in a phase shift keying implementation, embodiments of the present invention utilize two arms in which the voltage is anti-symmetric or differential (it should be noted that the response of each arm does not have to be symmetric with respect to voltage in some situations). Because, in some embodiments, the drive voltage is symmetric, it is possible to achieve zero and π phase shifts at the output. Thus, the use of two resonance structures (one in each arm) provides benefits not available using a single resonance structure.

The embodiments discussed in relation to FIGS. 2 and 5 are merely exemplary and modification and variations are included within the scope of the present invention. As an example, there can be more than one resonance structure on each Mach Zehnder arm, providing for multiple resonant structures with differing phase and transmission profiles. Additionally, other types of resonance structures, other than ring or disk-based structures, can be coupled to each Mach Zehnder arm, for example, a Fabry-Perot cavity, a set of coupled Fabry-Perot cavities to modify the transmission profile, or the like.

As discussed herein, the Mach Zehnder configuration provides for a full π phase shift at the output. It should be noted that if the phase shift on each arm is less than a desired phase shift, the phase shift can be traded off against insertion loss. Particularly, resonant coupling can be achieved such that a flat-top response is obtained (e.g., with multiple rings) and this effect can be accompanied by a lower insertion loss as a result of modifications in the transmission profile associated with the resonant structure. Additionally, complex resonant structures (e.g., multiple rings) are used in some embodiments to provide a larger phase shift across the resonance as a result in modifications in the phase profile for the resonant structure. In some implementations, a larger phase shift per refractive index change can be obtained by using a higher resonance Q resonator.

As discussed above, the phase control on each arm may be generated by thermal control (e.g., heaters) or carrier control (e.g., diodes) including depletion mode or enhancement mode. Embodiments of the present invention are characterized by a small footprint due to the fact that the large phase shifting section on a conventional interferometer is replaced by a relatively small resonant structure. It should be noted that diodes or any other high-speed phase shifting element can be placed anywhere on the resonant structure or the coupling region.

Figure 6:
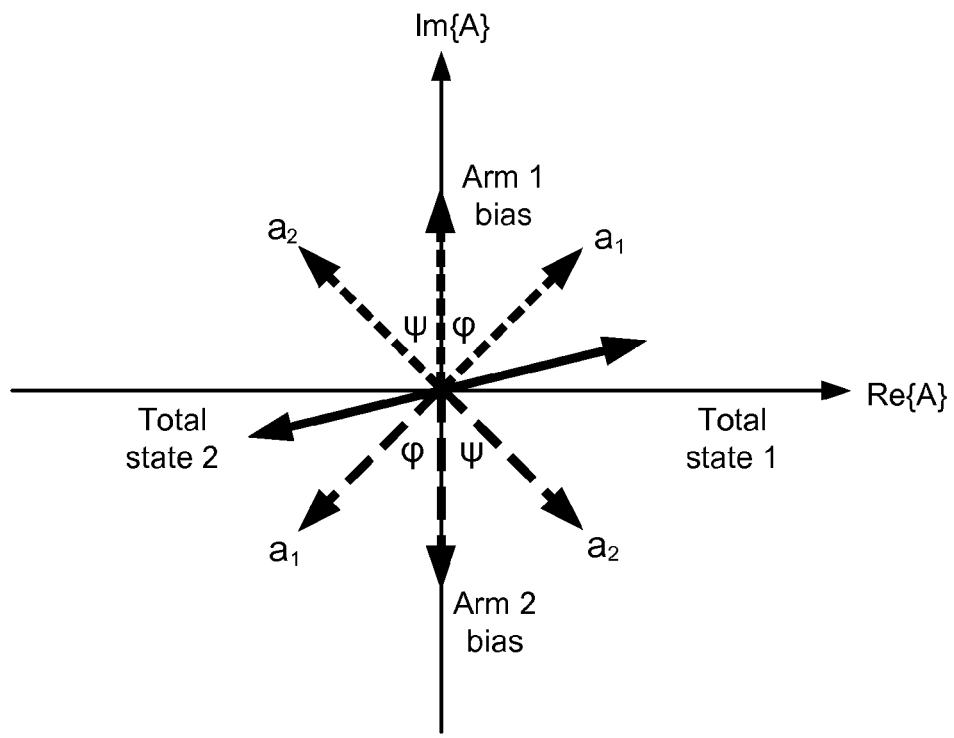
FIG. 6 is a plot illustrating the complex plane of the optical field amplitude during phase shift keying operation according to an embodiment of the present invention.

FIG. 6 is a plot illustrating the complex plane of the optical field amplitude during phase shift keying operation according to an embodiment of the present invention. In this embodiment, the double resonance assisted Mach Zehnder interferometer provides a π phase shift between the two output states even though the single arm transfer function is asymmetric. The two arms are DC biased at a null, using for example one or both of the phase control elements 260 and 262 (e.g., a heater) on one or both of the arms outside the resonant structure. The first arm is driven around two points related by the bias voltage by φ and ψ, respectively. The second arm is driven by the same voltages, but with a sign change in the imaginary axis. As illustrated in FIG. 6, each arm is driven between two voltage $V_1$ and $V_2$ (when the voltage is $V_1$ on one arm it is $V_2$ on the other) such that the transmission is:

$$T(V_1) = a_1 e^{-j\phi} \text{ and}$$

$$T(V_2) = a_2 e^{j\psi}.$$

In the special case of a symmetric single arm transfer function, $a_1 = a_2$ and $\phi = \psi$.

Given these assumptions, the complex amplitudes of the two output states are π phase shifted from each other:

$$A_1 = a_1 e^{j\left(\frac{\pi}{2}-\phi\right)} + a_2 e^{-j\left(\frac{\pi}{2}-\psi\right)}$$

$$A_2 = a_1 e^{j\left(\frac{3\pi}{2}-\phi\right)} + a_2 e^{j\left(\frac{\pi}{2}+\psi\right)} = a_1 e^{j\pi} e^{j\left(\frac{\pi}{2}-\phi\right)} + a_2 e^{j\pi} e^{-j\left(\frac{\pi}{2}-\psi\right)} = e^{j\pi} A_1$$

As illustrated in FIG. 6, some embodiments introduce a first predetermined phase delay in the first arm signal using a first resonance structure and introduce a second predetermined phase delay in the second arm signal using a second resonance structure. As an example, the first predetermined phase delay in the first arm signal can be introduced by differentially driving the first predetermined phase delay by $+\phi$ and $-\psi$ and the second predetermined phase delay in the second arm signal can be introduced by differentially driving the second predetermined phase delay by $-\psi$ and $+\phi$. As shown in FIG. 6, the same transfer function is used on each arm, with the drive applied differentially such that when the phase is $+\phi$ on one arm, the corresponding phase is $-\psi$ on the other arm, and vice versa.

Figure 7:
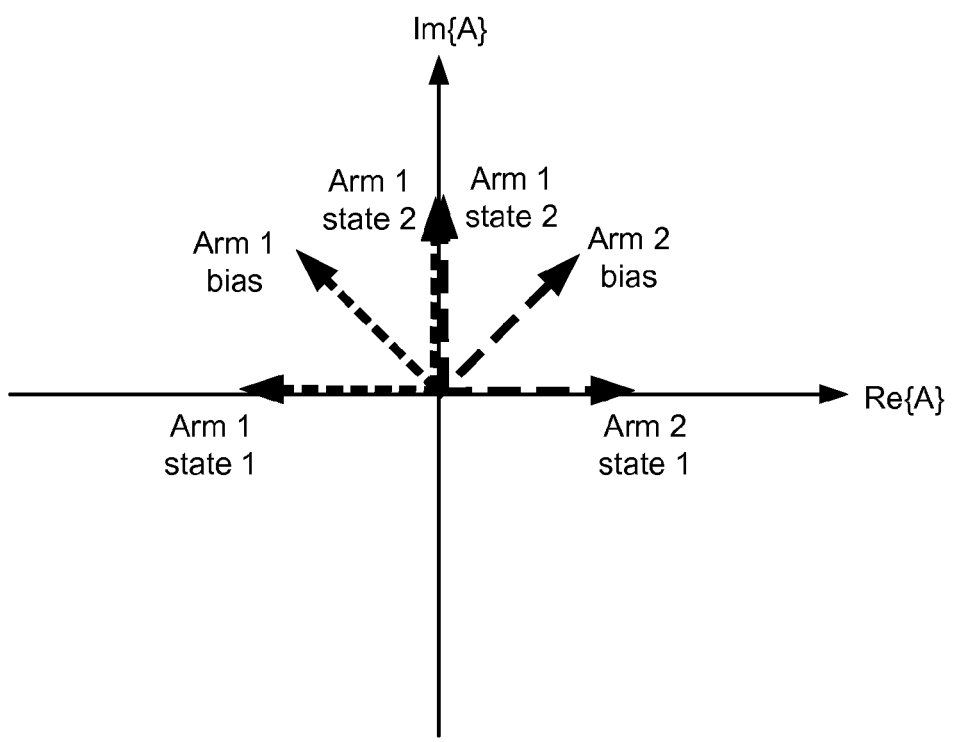
FIG. 7 is a plot illustrating the complex plane of the optical field amplitude during on-off keying operation according to an embodiment of the present invention.

FIG. 7 is a plot illustrating the complex plane of the optical field amplitude during on-off keying (OOK) operation according to an embodiment of the present invention. In this example, the DC bias between the two arms is $\pi/2$. Ideally, State 1 produces zero transmission and State 2 produces full transmission. In the ring examples described herein, implementation of OOK will produce a 3 dB loss as a result of the ring transfer function.

Figure 8:
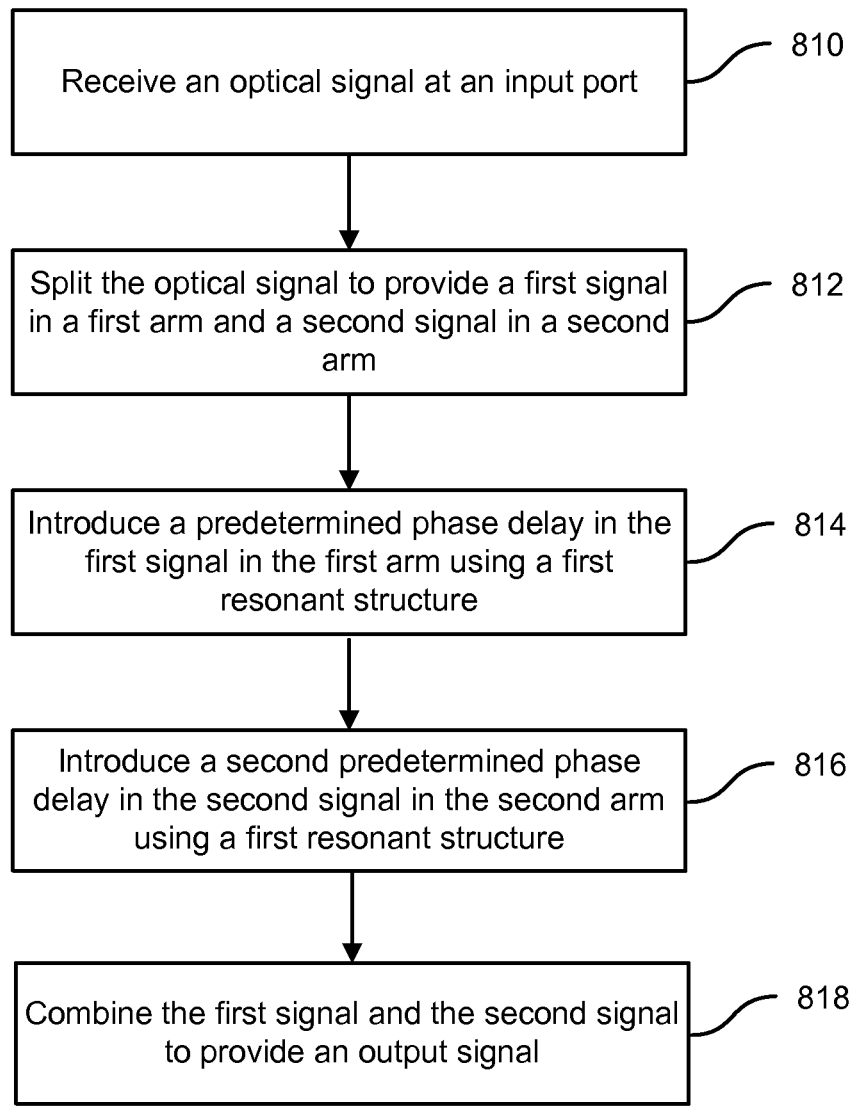
FIG. 8 is a simplified flowchart illustrating a method of operating a resonant structure according to an embodiment of the present invention.

FIG. 8 is a simplified flowchart illustrating a method of operating a resonant structure according to an embodiment of the present invention. As described below, modulation of an optical signal can be implemented using the resonant structures discussed herein. The method includes receiving an optical signal at an input port (810) and splitting the optical signal into a first arm signal and a second arm signal (812). Splitting the optical signal can passing the optical signal through a Y-branch optical coupler or other suitable optical coupler.

The method also includes introducing a first predetermined phase delay in the first arm signal (814) and introducing a second predetermined phase delay in the second arm signal (816). In a particular embodiment, the first predetermined phase delay is a high speed modified phase delay equal to $N\pi+/-\phi$ and the second predetermined phase delay is a high speed modified phase delay equal to $(1+N)\pi-/+\phi$. In other embodiments, other predetermined phase delays are utilized. Thus, embodiments utilize either or both of DC bias phase delay as well as modulated phase delay to cover both PSK and OOK implementations.

Introducing the first predetermined phase delay can be performed by coupling the first arm signal into a first resonant ring and introducing the second predetermined phase delay can be performed by coupling the second arm signal into a second resonant ring. Each of these resonant rings is optically coupled to one arm of the interferometer. Additionally, introducing the first predetermined phase delay can include coupling the first arm signal into a first resonant cavity and introducing the second predetermined phase delay can include coupling the second arm signal into a second resonant cavity. Thus, embodiments of the present invention are not limited to ring resonators.

In a particular embodiment, introducing the first predetermined phase delay equal to $+/-\phi$ in the first arm signal comprises differentially driving the phase delay by $+/-\phi$ and introducing the second predetermined phase delay equal to $-/+\phi$ in the second arm signal comprises differentially driving the phase delay by $+/-\phi$. In addition to this differential phase, a DC bias is applied or superimposed in some embodiments. In another embodiment, introducing the first predetermined phase delay equal to $N\pi+/-\phi$ in the first arm signal comprises differentially driving the phase delay by $+/-\phi$ and introducing the second predetermined phase delay equal to $(1+N)\pi-/+\phi$ in the second arm signal comprises differentially driving the phase delay by $+/-\phi$. In addition, a DC bias phase delay can be provided that can introduce a delay (e.g., $\pi$). An asymmetric transfer function is also possible as discussed above. As an example, N can have a variety of values including positive and negative values, 0, 1, ½, and the like.

The method further includes combining the phase delayed first arm signal and the phase delayed second arm signal to provide a modulated signal (820) and transmitting the modulated signal at an output port (822). In a particular embodiment, the first predetermined phase delay is associated with a first 3 dB point of a transmission function (e.g., the first 3 dB point is on a first side of a transmission resonance) and the second predetermined phase delay is associated with a second 3 dB point of the transmission function (e.g., on a second side of the transmission resonance).

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of modulating a signal, the method comprising:
   receiving an optical signal at an input port;
   splitting the optical signal into a first arm signal and a second arm signal;
   adjusting a DC bias phase of the first arm signal or the second arm signal using a first phase control element;
   introducing a first predetermined phase delay in the first arm signal using a first resonance structure, wherein:
   the first predetermined phase delay is equal to $+/-\phi$;
   the first predetermined phase delay is introduced using a second phase control element; and
   the first resonance structure is a ring structure;
   introducing a second predetermined phase delay in the second arm signal using a second resonance structure, wherein:
   the second predetermined phase delay is equal to $-/+\phi$;
   the second predetermined phase delay is introduced using a third phase control element; and
   the second resonant structure is a ring structure;
   combining the phase delayed first arm signal and the phase delayed second arm signal to provide a modulated signal; and
   transmitting the modulated signal at an output port.

2. The method of claim 1, wherein the first phase control element is added to the first resonant structure.

3. The method of claim 1 wherein splitting the optical signal comprises passing the optical signal through a Y-branch optical coupler.

4. The method of claim 1 wherein introducing the first predetermined phase delay comprises coupling the first arm signal into a first resonant structure and introducing the second predetermined phase delay comprises coupling the second arm signal into a second resonant structure.

5. The method of claim 4 wherein the first phase control element is a thermal phase control element and the second phase control element is a diode.

6. The method of claim 1 wherein introducing the first predetermined phase delay comprises coupling the first arm signal into a first resonant cavity and introducing the second predetermined phase delay comprises coupling the second arm signal into a second resonant cavity.

7. A method of modulating a signal, the method comprising:
receiving an optical signal at an input port;
splitting the optical signal into a first arm signal and a second arm signal;
adjusting a DC bias phase of the first arm signal or the second arm signal using a first phase control element;
introducing a first predetermined phase delay in the first arm signal using a first resonance structure, wherein:
introducing the first predetermined phase delay in the first arm signal comprises differentially driving the first predetermined phase delay by $+\phi$ and $-\psi$;
the first predetermined phase delay is introduced using a second phase control element; and
the first resonance structure is a ring structure;
introducing a second predetermined phase delay in the second arm signal using a second resonance structure, wherein:
introducing the second predetermined phase delay in the second arm signal comprises differentially driving the second predetermined phase delay by $-\psi$ and $+\phi$;
the second predetermined phase delay is introduced using a third phase control element; and
the second resonance structure is a ring structure;
combining the phase delayed first arm signal and the phase delayed second arm signal to provide a modulated signal; and
transmitting the modulated signal at an output port.

8. A method of modulating a signal, the method comprising:
receiving an optical signal at an input port;
splitting the optical signal into a first arm signal and a second arm signal;
adjusting a DC bias phase of the first arm signal or the second arm signal using a first phase control element;
introducing a first predetermined phase delay in the first arm signal using a first resonance structure, wherein:
introducing the first predetermined phase delay in the first arm signal comprises differentially driving the phase delay by equal to $N\pi+/-\phi$:
the first predetermined phase delay is introduced using a second phase control element; and
the first resonance structure is a ring structure;
introducing a second predetermined phase delay in the second arm signal using a second resonance structure, wherein:
introducing the second predetermined phase delay in the second arm signal comprises differentially driving the phase delay by $(1+N)\pi-/+\phi$;
the second predetermined phase delay is introduced using a third phase control element; and
the second resonance structure is a ring structure;
combining the phase delayed first arm signal and the phase delayed second arm signal to provide a modulated signal; and
transmitting the modulated signal at an output port.

9. The method of claim 1 wherein the first predetermined phase delay is associated with a first 3 dB point of a transmission function.

10. The method of claim 9 wherein the first 3 dB point is on a first side of a transmission resonance.

11. The method of claim 10 wherein the second predetermined phase delay is associated with a second 3 dB point of the transmission function on a second side of the transmission resonance.

12. The method of claim 7, wherein the first phase control element is added to the second resonant structure.

13. The method of claim 7 wherein splitting the optical signal comprises passing the optical signal through a Y-branch optical coupler.

14. The method of claim 7 wherein introducing the first predetermined phase delay comprises coupling the first arm signal into a first resonant structure and introducing the second predetermined phase delay comprises coupling the second arm signal into a second resonant structure.

15. The method of claim 14 wherein the first resonant structure comprises a first resonant ring and the second resonant structure comprises a second resonant ring.

16. The method of claim 7 wherein introducing the first predetermined phase delay comprises coupling the first arm signal into a first resonant cavity and introducing the second predetermined phase delay comprises coupling the second arm signal into a second resonant cavity.

17. The method of claim 7 wherein the first predetermined phase delay is associated with a first 3 dB point of a transmission function.

18. The method of claim 17 wherein the first 3 dB point is on a first side of a transmission resonance.

19. The method of claim 18 wherein the second predetermined phase delay is associated with a second 3 dB point of the transmission function on a second side of the transmission resonance.

20. The method of claim 8, wherein the first phase control element is added to the first resonant structure.

* * * * *